(12) United States Patent
Laffranchi et al.

(10) Patent No.: US 8,727,894 B2
(45) Date of Patent: May 20, 2014

(54) ELASTIC ROTARY ACTUATORS

(75) Inventors: Matteo Laffranchi, Samone (IT); Nikos G. Tsagarakis, Genoa (IT); Darwin G. Caldwell, Serra Ricco' (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 0 days.

(21) Appl. No.: 13/642,566

(22) PCT Filed: Apr. 28, 2011

(86) PCT No.: PCT/IB2011/051877
§ 371 (c)(1),
(2), (4) Date: Mar. 20, 2013

(87) PCT Pub. No.: WO2011/135537
PCT Pub. Date: Nov. 3, 2011

(65) Prior Publication Data
US 2013/0306430 A1 Nov. 21, 2013

(30) Foreign Application Priority Data
Apr. 28, 2010 (IT) .............................. TO2010A0360

(51) Int. Cl.
*F16D 3/66* (2006.01)
*F16F 15/139* (2006.01)

(52) U.S. Cl.
USPC .......................................... 464/68.41; 310/74

(58) Field of Classification Search
USPC ....................................................... 464/68.41
See application file for complete search history.

(56) References Cited

U.S. PATENT DOCUMENTS

| 4,739,866 A | 4/1988 | Reik et al. |
| 4,854,424 A * | 8/1989 | Yamatoh et al. ............. 188/72.1 |
| 6,681,911 B2 * | 1/2004 | Kroll et al. ................. 192/85.23 |
| 6,910,562 B2 * | 6/2005 | Bauer et al. ................ 192/70.17 |
| 2006/0135268 A1 | 6/2006 | Kim et al. |
| 2010/0253273 A1 * | 10/2010 | Tsagarakis et al. ........... 318/558 |

FOREIGN PATENT DOCUMENTS

| DE | 10217218 A1 | 10/2003 |
| EP | 1589256 A1 | 10/2005 |
| EP | 2239479 A1 | 10/2010 |

* cited by examiner

*Primary Examiner* — Richard M. Lorence
(74) *Attorney, Agent, or Firm* — Robert E. Alderson, Jr.

(57) ABSTRACT

Elastic rotary actuators are provided having breaking units arranged in such a way as to apply on an output member an adjustable braking torque in order to introduce adjustable damping between an input member and the output member in parallel to elastic members.

16 Claims, 3 Drawing Sheets

ELASTIC ROTARY ACTUATORS

CROSS-REFERENCE TO RELATED APPLICATIONS

This application is a National Phase Application of PCT International Application No. PCT/IB2011/051877, International Filing Date, Apr. 28, 2011 claiming priority to Italian Patent Application No. TO2010A000360, filed Apr. 28, 2010, both of which are hereby incorporated by reference in their entirety.

FIELD OF THE INVENTION

The present invention refers to an elastic rotary actuator, particularly for robotic applications, comprising an output member and an input member which are rotatable about the same axis of rotation, elastic means interposed between the input member and the output member to make the torsional connection between these members flexible, a driving unit operatively connected to the input member to cause it to rotate about said axis of rotation, sensor means for providing at least one first signal indicative of the angular position of the output member about said axis of rotation, and control means arranged to receive said first signal and to control the driving unit so as to position the output member in a desired angular position about said axis of rotation, as specified in the preamble of the attached independent claim 1.

BACKGROUND OF THE INVENTION

An elastic rotary actuator of the above-defined type is known from EP2239479. This known actuator offers evident advantages, such as in particular the fact that it is compact, it has a modular structure which allows to use it even within complex robotic systems and it allows to actively adjust the stiffness in a wide interval of desired stiffness values. On the other hand, this known actuator suffers from the drawback that the output member is subject, due to the provision of elastic means interposed between itself and the input member, to oscillations about the desired position. In certain applications these oscillations may not be tolerated, since for instance the output member may be required to reach the desired position without going beyond it.

SUMMARY OF THE INVENTION

It is therefore an object of the present invention to provide an elastic rotary actuator of the above-defined type, which does not suffer from the above-discussed drawback of the prior art.

This and other objects are fully achieved according to the present invention by virtue of an elastic rotary actuator having the features set forth in the characterizing part of the attached independent claim 1.

Preferred embodiments of an elastic rotary actuator according to the present invention are the subject-matter of the dependent claims, the content of which is to be intended as integral and integrating part of the present description.

In short, the invention is based on the idea of providing an elastic rotary actuator of the above-identified type, which further comprises braking means arranged to apply on the output member an adjustable braking torque, so as to introduce an adjustable damping between the input member and the output member, in parallel to the elastic means. The damping introduced between the input member and the output member allows to dampen the torsional oscillations of the output member resulting from the provision of elastic means between the input member and the output member. Moreover, thanks to the braking means being arranged to apply on the output member an adjustable braking torque, the damping factor of the actuator can be adjusted so as to provide the desired behaviour of the output member.

Preferably, respective braking surfaces are associated to the input member and to the output member, which surfaces extend perpendicular to the axis of rotation of these members and are drivingly connected for rotation each with the respective member (input member and output member) of the actuator, and the braking means are arranged to press these surfaces against each other with a given force so as to obtain, due to the friction between these surfaces, the desired braking torque.

Preferably, the braking surface associated to the output member is axially fixed relative to this member, whereas the braking surface associated to the input member is axially movable relative to this member, and the braking means are arranged to urge with a given force the braking surface associated to the input member against the braking surface associated to the output member.

Preferably, the braking means are arranged coaxially to the driving unit and around it, the braking means and the driving unit assuming therefore an axially overlapping or compenetrating arrangement which allows to make the actuator particularly compact.

Preferably, the braking means are piezoelectrically-actuated braking means.

Preferably, the braking means comprise a plurality of stack piezoelectric actuators which extend parallel to the axis of the input and output members and are arranged angularly equally spaced along a circumference the axis of which coincides with the axis of rotation of the input and output members of the actuator and which extends radially outwardly of the driving unit.

Further features and advantages of the present invention will appear from the following detailed description, given purely by way of non-limiting examples and referring to the appended drawings briefly described below.

DETAILED DESCRIPTION

Figure 1:
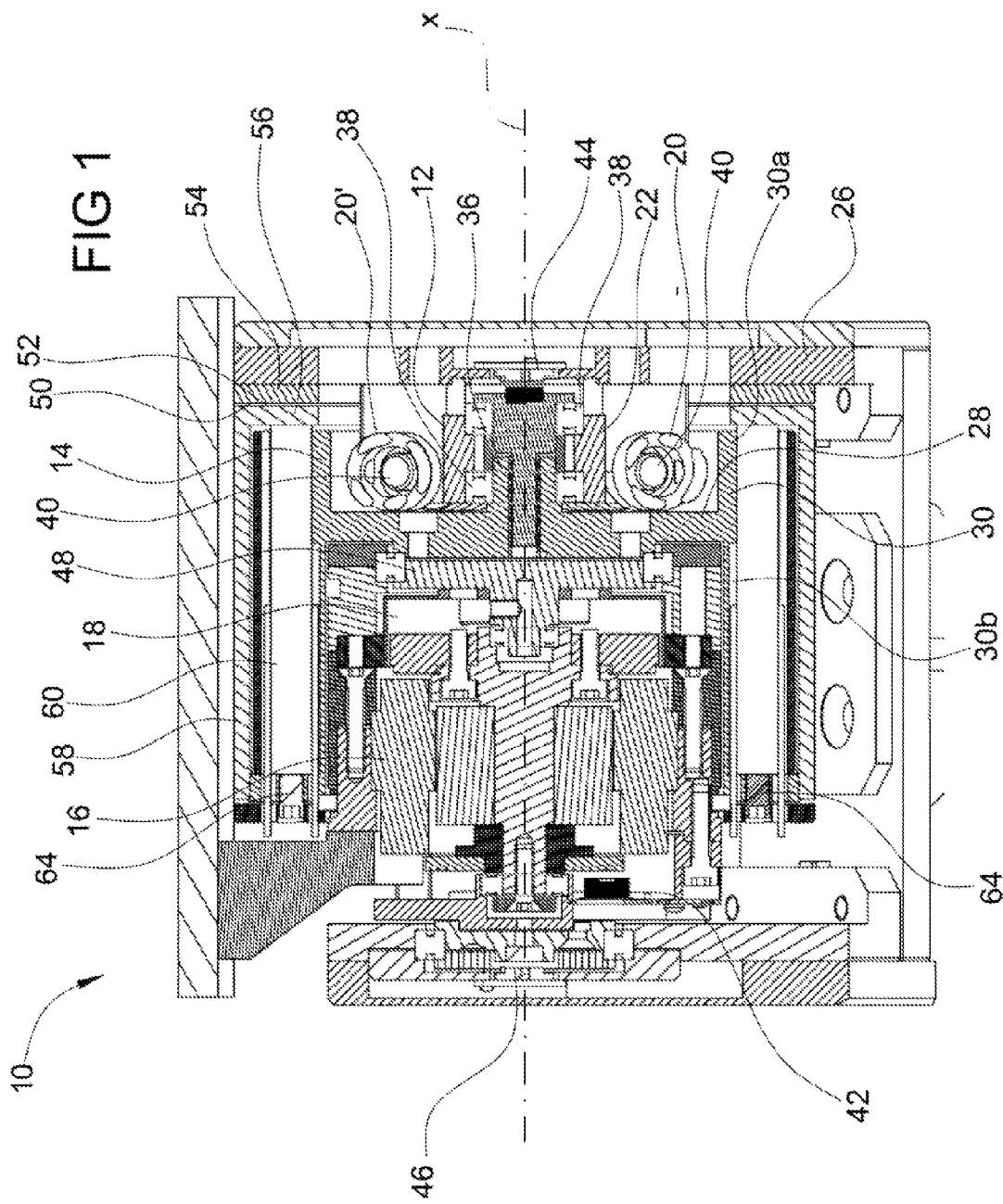
FIG. 1 is an axial section view of an elastic rotary actuator according to a preferred embodiment of the present invention.

In the following description and claims, the term "axial" is used to identify the direction of the axis of rotation of the input and output members of the actuator, while the term "radial" is used to identify a direction perpendicular to the axis of rotation of the input and output members of the actuator.

With reference to the drawings, an elastic rotary actuator according to a preferred embodiment of the present invention is generally indicated 10 and basically comprises:

an output member 12 rotatable about an axis of rotation X;
an input member 14 coaxial to the output member 12 and also rotatable about the axis of rotation X;
a driving unit comprising a motor 16, advantageously an electric motor arranged to produce as output a rotary motion about the axis of rotation X, and if necessary also a reduction unit 18, the driving unit being operatively connected to the input member 14 to cause it to rotate about the axis of rotation X; and a plurality of elastic elements 20 and 20', which in the proposed embodiment are made as springs and are interposed between the output member 12 and the input member 14 so as to torsionally connect these members, though allowing, as a result of their elastic deformability, these members to rotate relative to each other about the axis of rotation X.

The output member 12 and the input member 14, as well as the driving unit and the elastic elements 20 and 20', are housed in a case (only partially shown in the drawings), which is advantageously provided with fixing means (of per-se-known type) to allow it to be attached for instance to a robot arm, the output member being in that case attached for instance to another robot arm or to an end member of a robot (be it either a gripping member or an operating member).

As far as the driving unit is concerned, its structure will not be described in detail herein, since it is of per-se-known type and in any case it is not essential for the invention. The motor and the reduction unit may in fact have a different structure from the one illustrated in the drawings and, at worst, the reduction unit might even be omitted.

The output member 12 comprises a middle portion or hub 22 and a plurality of radial portions or spokes 24 which extend radially from the hub 22 and are arranged angularly equally spaced. More specifically, in the illustrated embodiment the output member 12 comprises three spokes 24 arranged at 120 degrees, but it is clear that the number of spokes may be different from the one indicated herein. A mounting plate 26 is attached to the output member 12 for connection to an external load intended to be rotated by the actuator 10 in a controlled manner (i.e. at least in a given direction and by a given angle).

The input member 14 comprises a circular plate 28, which is arranged in a plane perpendicular to the axis of rotation X and the axis of which coincides with the axis of rotation X, and a cylindrical sleeve 30, which is arranged coaxially to the circular plate 28 and is divided by this latter into a first sleeve portion 30a facing towards the output member 12 and a second sleeve portion 30b facing towards the driving unit. The first sleeve portion 30a defines with the circular plate 28 a first chamber where the input member 14 and the springs 20 and 20' are accommodated, as clearly results in particular from FIG. 1. The second sleeve portion 30b defines with the circular plate 28 a second chamber where the driving unit is accommodated. The input member 14 further comprises a plurality of abutment elements 32 the number of which is equal to that of the spokes 24 of the output member 12, hence equal to three in the embodiment proposed herein. Each abutment element 32 forms a pair of wedge-like surfaces 34 and 34', which are inclined to each other and each to the radial direction. As shown in FIG. 2, in the assembled condition the wedge-like surfaces 34 and 34' of each abutment element 32 are oriented parallel each to a respective spoke 24 of the output member 12. The input member 14 further comprises a hub 36 which extends inside the hub 22 of the output member 12, coaxially thereto. Between the hub 36 of the input member 14 and the hub 22 of the output member 12 rotation support means, for instance a pair of radial ball bearings 38, are arranged to support the hub (outer hub) 22 for rotation with respect to the hub (inner hub) 36.

In the proposed embodiment, the elastic elements 20 and 20' are made as cylindrical helical springs arranged with their axes in a same plane perpendicular to the axis of rotation X (in other words, a plane parallel to that of FIG. 2). More specifically, the axes of the springs 20 and 20' are oriented in such a manner that each spring applies on the output member 12 a force directed tangentially, i.e. perpendicular to the radial direction. A pair of springs 20 and 20' are provided for each spoke 24 of the output member 12 (therefore, three pairs of springs in the proposed embodiment), the springs of each pair insisting each on the one hand against a respective face of the associated spoke 24 of the output member 12 and on the other hand against the wedge-like surface 34 and 34', respectively, of a respective abutment element 32 facing towards said face. The springs 20 and 20' are advantageously mounted in a pre-loaded or pre-deformed condition, for instance with a pre-loading or pre-deformation equal to half the maximum deformation allowed. Preferably, the springs 20 and 20' are compression springs and are therefore mounted between the respective facing abutment surfaces of the output member 12 and of the input member 14 in a pre-compressed condition, for instance with a pre-compression equal to half the maximum compression allowed. A pair of pegs 40 are inserted into each spring 20 and 20' and are fixed the one to a spoke 24 and the other to an abutment element 34 and operate as mechanical stops for avoiding deformations of the springs greater than a given maximum value allowed.

Thanks to the above-described arrangement of the springs, in case of relative rotation of the output member 12 relative to the input member 14 in one direction, a first spring 20 or 20' of each pair of springs 20 and 20' is more compressed than the second spring 20' or 20, whereas in case of relative rotation of the two members 12 and 14 in the other direction, the second spring 20' or 20 is more compressed than the first spring 20 or 20'. The torque produced by the actuator (the torque on the output member 12) is proportional to the difference between the compression forces acting on the springs of each pair of springs 20 and 20'. With reference in particular to FIG. 2, if the input member 14 is rotated counter-clockwise by the driving unit, the wedge-like surfaces 34 of the abutment elements 32 of the input member 14 apply a compression force on the springs 20 of each pair of springs 20 and 20' and, through the springs, a tangential force on the spokes 24 of the output member 12 tending to cause also the output member 12 to rotate counter-clockwise. Likewise, if the input member 14 is rotated clockwise, the wedge-like surfaces 34' apply a compression force on the springs 20' and, through these latter, a tangential force on the spokes 24 of the output member 12 tending to cause this latter to rotate clockwise.

The motor 16 is provided with a position sensor 42 (FIG. 1) arranged to provide a signal indicative of the angular position of an output shaft of the same motor, and hence of the input member 14 connected thereto (in the present case, through the reduction unit 18). The actuator 10 further comprises a position sensor 46 (FIG. 1) arranged to provide a signal indicative of the angular position of the output member 12. Preferably, the actuator 10 further comprises a position sensor 44 (FIG. 1) arranged to provide a signal indicative of the relative rotation between the output member 12 and the input member 14, and hence of the deformation of the springs 20 and 20' interposed between these members. Preferably, the actuator 10 further comprises a torque sensor 48 (FIG. 1) arranged to provide a signal indicative of the torque generated by the actuator 10, the torque sensor 48 being for instance mounted on the output of the reduction unit 18. The actuator 10 further comprises an electronic control unit (per-se-known and not shown) arranged to receive in input the signals provided by the above-mentioned sensors and to drive the electric motor 16 depending on these signals, in particular on the signal indicative of the angular position of the output member 12 provided by the position sensor 46, so as to allow to position the output member 12 in a given angular position about the axis of rotation X.

Figure 2:
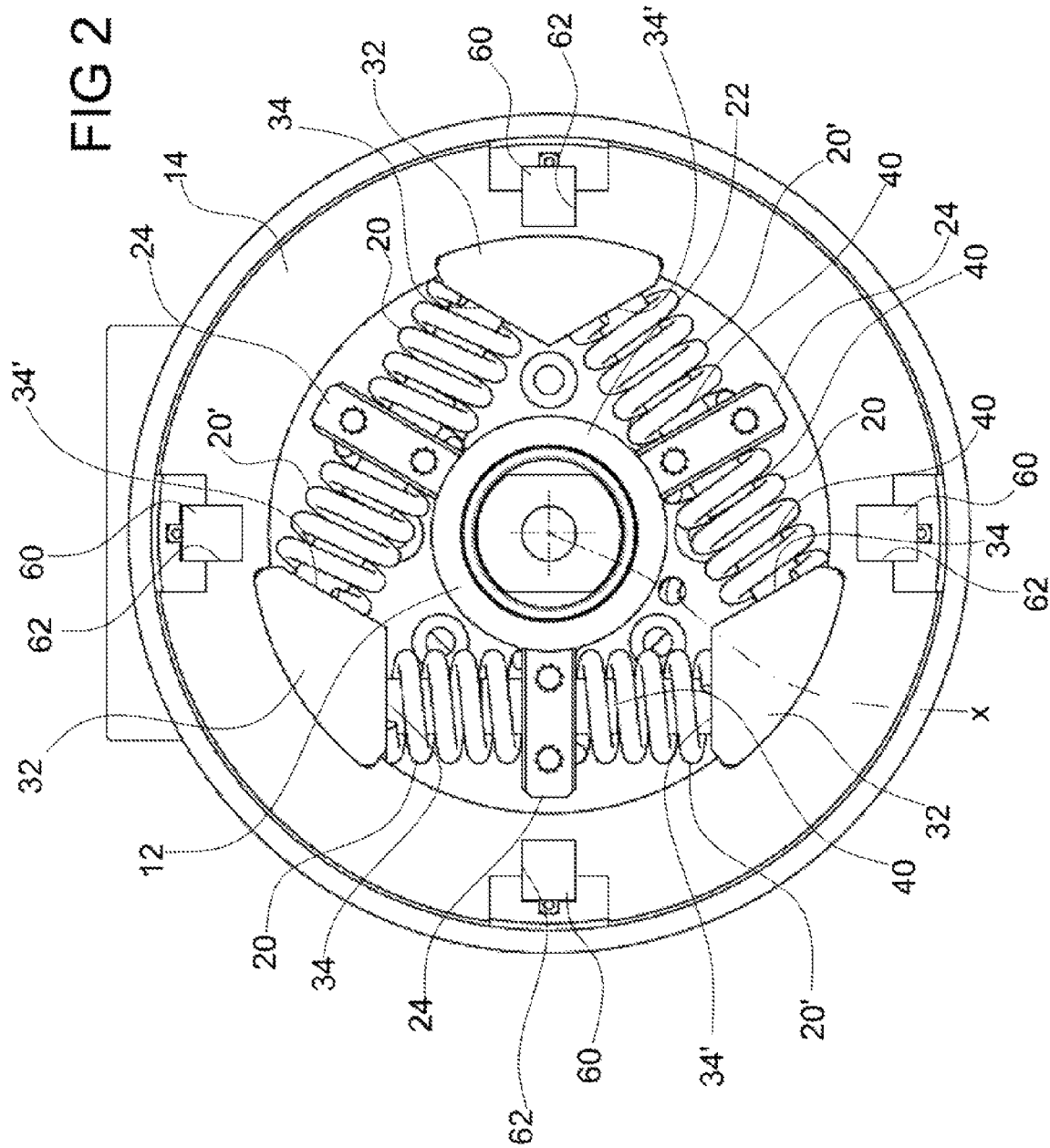
FIG. 2 is a front view of the assembly formed by the input member, by the output member and by the elastic means (springs) of the elastic rotary actuator of FIG. 1.
Figure 3:
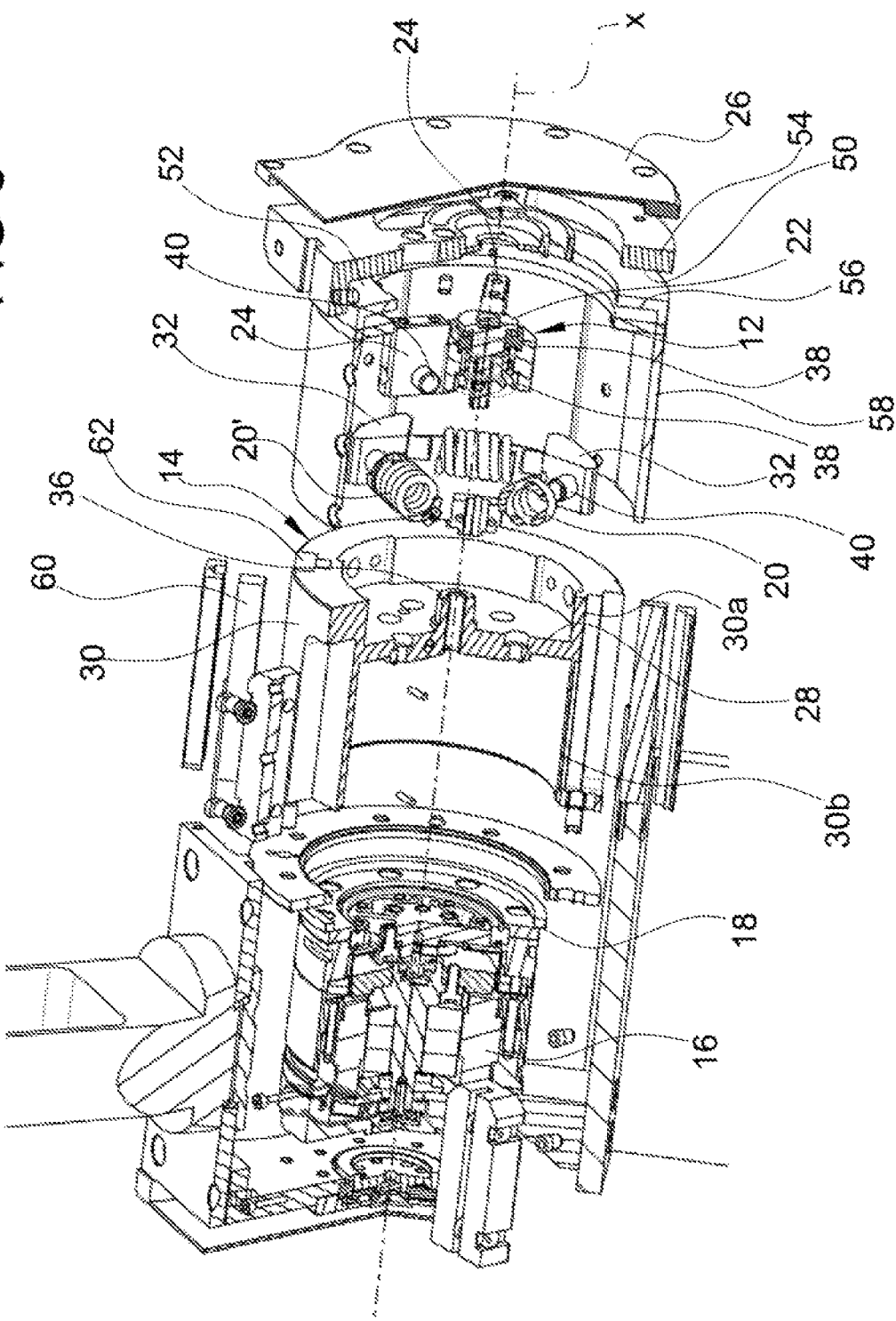
FIG. 3 is an axonometric, partially exploded view of the elastic rotary actuator of FIG. 1.

With reference now in particular to FIGS. 1 and 3, the elastic rotary actuator 10 further comprises according to the invention a braking device arranged to apply an adjustable braking torque on the output member 12, so as to introduce an adjustable damping between the input member 14 and the output member 12, in parallel to the elastic elements 20 and 20', in order to dampen the torsional oscillations of the output member 12 caused in use by the flexibility of the elastic elements 20 and 20'. To this end, the braking device is arranged to urge against each other with a given force a first braking surface 50 and a second braking surface 52 which extend perpendicular to the axis of rotation X and are drivingly connected for rotation the first one with the output member 12 and the second one with the input member 14. The first braking surface 50 is a flat annular surface provided by the inner face of a first braking disc 54 attached to the output member 12. The second braking surface 52 is a flat annular surface provided by the outer face of a second braking disc 56 attached to the end axially facing towards the first braking disc 54 of a hollow cylindrical member 58 arranged coaxially to and outwardly of the input member 14 so as to be axially movable but fixed for rotation with respect to this member. The braking device comprises a plurality of actuators 60 radially interposed between the input member 14 and the hollow cylindrical member 58 to urge the second braking disc 56 attached to this last member against the first braking disc 54, whereby the braking surfaces 50 and 52 of the braking discs 56 and 58 are pressed against each other with a normal force the intensity of which is such as to produce, as a result of the friction between these surfaces, the desired braking torque. The actuators 60 are advantageously made as piezoelectric actuators, in particular as stack piezoelectric actuators, and are accommodated in cavities 62 which are angularly equally spaced on the outer lateral surface of the cylindrical sleeve 30 of the input member 14 and are oriented parallel to the axis of rotation X. In the proposed embodiment, four piezoelectric actuators 60 arranged at 90 degrees are provided, but a different number of actuators, for instance three actuators arranged at 120 degrees, might naturally be envisaged. The piezoelectric actuators 60 are electrically interconnected in parallel and are controlled with an analog voltage by an operational amplifier under control of the electronic control unit, so as to apply a normal force of such an intensity as to produce the desired damping effect. Since the normal force applied by the piezoelectric actuators 60 on the braking surfaces 50 and 52, and hence the braking torque acting on the output member 12, can be suitably changed depending on the voltage command imparted by the operational amplifier, the damping factor can be varied so as to obtain the desired behaviour of the output member 12. A respective adjustment screw 64 (FIG. 1) for adjusting the travel of the actuator is associated to each piezoelectric actuator 60.

In the light of the above description, the advantages offered by the present invention are clear.

First of all, the use of a braking device acting on the output member of the actuator allows to dampen the torsional oscillations caused by the provision of elastic elements between the input member and the output member. The braking device is able to produce each time a normal force having the desired intensity, thus allowing to effectively control the potential energy stored in and released from the elastic elements of the actuator.

Secondly, the use of piezoelectric actuators, and hence of actuators which are by definition small, light and "clean", as actuators arranged to produce the desired braking torque on the output member, allows to integrate the braking device inside the case of the actuator without substantially increasing the size and weight thereof. In this connection, since the actuators are arranged around the driving unit, with an axially overlapping or compenetrating arrangement, the actuator can be made particularly compact and hence particularly suitable for being used on robotic systems.

Naturally, the principle of the invention remaining unchanged, the embodiments and the constructional details may vary widely with respect to those described and illustrated purely by way of non-limiting example.

The invention claimed is:

1. An elastic rotary actuator comprising
an output member rotatable about an axis of rotation;
an input member rotatable about said axis of rotation;
an elastic member interposed between the output member and the input member in such a manner as to allow the transmission of torque between the output and input members about said axis of rotation, and to allow at the same time, as a result of the elastic deformation of the elastic member, a relative rotation between the output and input members about said axis of rotation;
a driving unit operatively connected to the input member to cause it to rotate about said axis of rotation;
a first sensor for providing a signal indicative of the angular position of the output member about said axis of rotation;
an electronic control unit arranged to receive the signal provided by said first sensor and to control the driving unit so as to position the output member in a desired angular position about said axis of rotation; and
a braking unit arranged to apply a variable braking torque on the output member, thereby introducing an adjustable damping between the input member and the output member, in parallel to said elastic member,
wherein said braking unit is arranged around the driving unit with an axially overlapping or copenetrating arrangement relative thereto.

2. The actuator of claim 1, comprising a first braking surface and a second braking surface which extend perpendicular to said axis of rotation and are drivingly connected for rotation with the output member and with the input member, respectively, wherein said braking unit is arranged to press said first and second braking surfaces against each other with a given force so as to obtain, as a result of the friction between said first and second braking surfaces, the desired braking torque.

3. The actuator of claim 2, wherein said first braking surface is axially fixed relative to the output member, wherein said second braking surface is axially movable relative to the input member, and wherein said braking unit is arranged to urge said first braking surface against said second braking surface with a given force.

4. The actuator of claim 3, wherein said first braking surface is provided by a first braking disc rigidly connected to the output member, and wherein said second braking surface is provided by a second braking disc which is drivingly connected for rotation with the input member but axially movable relative to the input member.

5. The actuator of claim 4, wherein the output member is axially and radially contained within the input member and wherein said second braking disc is attached to a hollow cylindrical member arranged coaxially to and outwardly of the input member.

6. The actuator of claim 5, wherein said braking unit is radially interposed between the input member and the hollow cylindrical member.

7. The actuator of claim 1, wherein the driving unit comprises an electric motor arranged to generate as output, a rotary motion about said axis of rotation.

8. The actuator of claim 1, wherein said braking unit comprises piezoelectrically-actuated braking elements.

9. The actuator of claim 8, wherein said braking unit comprises a plurality of stack piezoelectric actuators which extend parallel to said axis of rotation and which are arranged along a circumference the axis of which coincides with said axis of rotation.

10. The actuator of claim 9, wherein the input member comprises a cylindrical sleeve and wherein the piezoelectric actuators are received in cavities which are provided on an outer lateral surface of said cylindrical sleeve and are oriented parallel to said axis of rotation.

11. The actuator of claim 9, wherein the piezoelectric actuators are arranged angularly equally spaced about said axis of rotation.

12. The actuator of claim 9, further comprising an operational amplifier connected to the piezoelectric actuators and to the electronic control unit, wherein the piezoelectric actuators are electrically connected in parallel to each other and are operated with an analog voltage by said operational amplifier under control of said electronic control unit.

13. The actuator of claim 9, further comprising, for each piezoelectric actuator, a respective adjusting screw for adjusting the travel of the piezoelectric actuator.

14. The actuator of claim 1, further comprising a second sensor for providing a signal indicative of the angular position of the input member about said axis of rotation and/or a third sensor for providing a signal indicative of the relative rotation between the output member and the input member about said axis of rotation.

15. An elastic rotary actuator comprising
an output member rotatable about an axis of rotation;
an input member rotatable about said axis of rotation;
an elastic member interposed between the output member and the input member in such a manner as to allow the transmission of torque between the output and input members about said axis of rotation, and to allow at the same time, as a result of the elastic deformation of the elastic member, a relative rotation between the output and input members about said axis of rotation;
a driving unit operatively connected to the input member to cause it to rotate about said axis of rotation;
a first sensor for providing a signal indicative of the angular position of the output member about said axis of rotation;
an electronic control unit arranged to receive the signal provided by said first sensor and to control the driving unit so as to position the output member in a desired angular position about said axis of rotation; and
a braking unit arranged to apply a variable braking torque on the output member, thereby introducing an adjustable damping between the input member and the output member, in parallel to said elastic member,
wherein said actuator further comprises a first braking surface and a second braking surface which extend perpendicular to said axis of rotation and are drivingly connected for rotation with the output member and with the input member, respectively, wherein said braking unit is arranged to press said first and second braking surfaces against each other with a given force so as to obtain, as a result of the friction between said first and second braking surfaces, the desired braking torque,
wherein said first braking surface is axially fixed relative to the output member, wherein said second braking surface is axially movable relative to the input member, and wherein said braking unit is arranged to urge said first braking surface against said second braking surface with a given force,
wherein said first braking surface is provided by a first braking disc rigidly connected to the output member, and wherein said second braking surface is provided by a second braking disc which is drivingly connected for rotation with the input member but axially movable relative to the input member, and
wherein the output member is axially and radially contained within the input member and wherein said second braking disc is attached to a hollow cylindrical member arranged coaxially to and outwardly of the input member.

16. The actuator of claim 15, wherein said braking unit is radially interposed between the input member and the hollow cylindrical member.

* * * * *